(12) United States Patent
Aadland (10) Patent No.: US 6,761,233 B1
(45) Date of Patent: Jul. 13, 2004

(54) APPARATUS FOR PROPULSION IN ELONGATED CAVITIES

(75) Inventor: Harald Aadland, Nesttun (NO)

(73) Assignee: AA Technology AS, Nesttun (NO)

( * ) Notice: Subject to any disclaimer, the term of this patent is extended or adjusted under 35 U.S.C. 154(b) by 0 days.

(21) Appl. No.: 09/937,104

(22) PCT Filed: Mar. 22, 2000

(86) PCT No.: PCT/NO00/00104

§ 371 (c)(1),
(2), (4) Date: Jan. 4, 2002

(87) PCT Pub. No.: WO00/57100

PCT Pub. Date: Sep. 28, 2000

(30) Foreign Application Priority Data

Mar. 22, 1999  (NO) .......................................... 1999-1368

(51) Int. Cl.$^7$ ................................................. E21B 4/00
(52) U.S. Cl. ......................... 175/97; 175/230; 166/217; 166/241.3
(58) Field of Search ........................... 175/97, 98, 230; 166/217, 241.3, 174, 50

(56) References Cited

U.S. PATENT DOCUMENTS

| 4,046,204 | A | * | 9/1977 | Takaoka et al. |
| 4,580,642 | A | * | 4/1986 | Gosch |
| 5,794,703 | A | * | 8/1998 | Newman et al. |
| 6,031,371 | A | * | 2/2000 | Smart |
| 6,112,809 | A | * | 9/2000 | Angle |
| 6,453,999 | B1 | * | 9/2002 | Reinholdt |
| 6,464,003 | B2 | * | 10/2002 | Bloom et al. |

* cited by examiner

Primary Examiner—Roger Schoeppel
(74) Attorney, Agent, or Firm—Francis C. Hand; Carella, Byrne, Bain et al (57) ABSTRACT

An apparatus for propulsion inside an oblong cavity, such as pipes or the like, is disclosed. The apparatus is characterized by comprising a central rotating part comprising an inclined wheel construction arranged to thrust towards the inner wall of the cavity, in that the central rotating part comprises a plurality of roller elements (1) arranged in a row against each other, and two adjacent roller elements (1) in the row comprise mutually adjacent inclined sliding faces (15), so that each element is arranged to be displaced in radial direction outward from a central shaft (11) due to axial compression of the unit of inclined roller elements, until the corresponding wheel construction abuts the inner wall of the cavity, and that the wheel construction includes that a bearing construction is arranged enclosing around each roller element, and being rotatably independent of its corresponding roller element, and is mounted at an inclined angle defining the climbing angle of the apparatus during propulsion, and further the apparatus comprises drive means for rotation of the rotatable part. It is an essential feature of the apparatus that it comprises internal rotational counter force, and that automatic transmission may be provided.

10 Claims, 8 Drawing Sheets

APPARATUS FOR PROPULSION IN ELONGATED CAVITIES

BACKGROUND OF THE INVENTION

The present invention concerns an apparatus for propulsion in oblong cavities and pipes; as stated in the preamble of the following claim 1.

By oblong cavities is meant pipes, ducts, drilled or mined holes in rock, or wells which are drilled with or without casing in the ground (oil related holes), in metals or other materials.

FIELD OF THE INVENTION

According to the invention the apparatus is used when inspection or different kind of work are performed in such cavities. According to the invention the apparatus may be used to force forward the equipment for boring the hole, but can also be used for pulling equipment through the cavity.

In such cavities, pipes and ducts, where it is not possible to use people there is often need for inspection, service, maintenance and other work to be done. It might also be necessary to increase the propelling power on the drilling equipment which is drilling holes/wells.

In vertical holes, for example in oil related wells, it is normal to pull the necessary equipment down into the well by means of gravity, if it is not pushed downward by means of a pipe. In horizontal holes or pipes where it is not possible to utilize gravity, an apparatus for pulling or pushing is required for the equipment to be transported. Different hydraulic methods to pump forward equipment have also been tested. The methods which are based on pipes for transporting the equipment, require a lot of space and personel to run it all day and night, and further the transportation speed is relatively low.

DESCRIPTION OF THE RELATED ART

From British patent GB-1.328.886 a vehicle coupled to a coiled tubing is known, thus enabling the vehicle to pull or push the coiled tubing.

From British patent patent GB-2.196.715 a device which is driven forward by liquid or gas pressure through a pipeline is known.

From GB-2.200.970 a vehicle having motor powered wheels is known, but where propulsion may be provided also by means of chain and sprocket wheels.

From U.S. Pat. No. 4,941,511 a joint separated vehicle is known, where one part includes the energy source and the other part includes a motor connected to the driving wheels. A similar device is known from GB patent specification 2.122.713.

From EP patent specification 0.461.964 a vehicle where propulsion is generated by means of motor driven belts or wheels is known.

In DE patent specification 3.206.033 there is shown a vehicle where the propulsion is provided by means of an obliqued wheel, the wheel axis of which is mounted eccentric on an shaft shich is positioned centric of the vehicle. The wheel is therefore aligned mainly crosswise to the traction direction. Said eccentricity causes the wheel to be in contact with the pipe wall and the contact point moves as the shaft is rotated. The oblique position of the wheel causes that the movement of the contact point also generates propulsion. Further the vehicle is also equipped with radial directed wheels which abut the pipe wall for centring the vehicle inside the pipe line. Further the vehicle is equipped with radial directed wheals which abut the pipe wall for centering the vehicle inside the pipe, and for giving counter-torque to the drive motor.

From SU patent 481 784 a vehicle is known where several crosswise spring loaded wheels are mounted adjacent the surface of the vehicle so that the wheels abut the pipe wall and centers the vehicle within the pipe line. When the vehicle rotates around it's own axis, the wheels cause a propulsion corresponding to the wheel angle. This apparatus need counter force torque.

From Norwegian Patent No. 178.276 a pipe tractor arranged to move within canals and pipes is known, in that the end portions of the tractor is mounted and equipped with spring loaded arms to which crosswise wheels are mounted, and the wheels abut the inner surface of the pipe, so that side force affecting the wheels provides for propulsion of the vehicle when the end portions are rotating. The end portions rotate in opposite directions related to each other, and one of the ends acts as counter torque for the other end, and visa versa.

From International patent PCT/GB93/0111 a down hole tool is known, for providing rotary support of a downhole assembly in which the tool is incorporated. The tool also converts rotary contact with the wellbore into a longitudinal force which turns the assembly along the wellbore. The tool comprises a stabiliser including rollers, wherein the roller axis are skewed to be tangential to a notional helix, such that the natural path of roller contact with the wellbore has a longitudinal component in addition to the usual circumferential path. The tool can be used on drill strings and in downhole assemblies with motor. The tool may also pull a cable supplying the tool with electricity/hydraulic power for the propulsion machinery.

The pulling-/pushing apparatus of today are encumbered with a lot of disadvantages. Firstly they are very complex, they have a limited operation range and they are produced for dedicated actions/tasks which they are intended to execute. There are also strict requirements regarding the surroundings in which they are used.

It is an object of the invention to prepare a new and improved propulsion apparatus for transporting (pushing/pulling) through pipes/cavities.

Further it is an object to produce an apparatus which may effect an increased pulling power, independent of the design of the cavity, and reduced demands to the strength/toughness of the inside wall of the pipe/cavity.

A further object is to produce an apparatus that can work without any counter torque. Finally it is an object to produce a shorter propulsion apparatus with lower weight, therefore being easier to handle, and may carry more equipment for each trip.

The apparatus of the present invention is characterized by the features which are defined in the characterizing clause of the following claim 1.

The preferred embodiments of the apparatus in accordance to the invention are stated in dependent patent claims.

With this invention an apparatus with a simple construction is designed, and which is easy to run and covers a large working area, and more specific the apparatus may operate in ducts having very variable cross section and variable diameter, that is to say within the working range of the apparatus within the maximum and minimum diameters for its operation. The apparatus involves a simple design so that different sizes of it may pull/push i holes having diameter ranges of millimeter to several meters.

The apparatus is further designed for automatic adjustment of the pulling force, independent of the design of the cavity. This occur when the traction roller (the sliding element), against the action of spring force, changes its orientation from its maximum angle position relative to the longitudinal axis of the apparatus, and to the position where it is perpendicular to the longitudinal axis. Then the apparatus rotates with the wheels running so the propulsion of the apparatus becomes zero. Thus if the mass of the tool to be pulled and/or be pushed becomes too large, one avoids the apparatus being exposed to overload. The contact point of the traction roller towards the pipe wall moves in a non-slipping revolving movement around the pipe wall.

It has no consequences either the cavity is angular or round, and the diameter may be changed continuously as long as it stays within the maximum/minimum operation diameter of the apparatus. In contrary to the previously known traction mechanisms, which require uniform holes, this apparatus can go into any kind of holes.

The device according to the invention, does no need any counter torque, due to the fact that its motor rotational torque has internally counter force within the device.

The apparatus may generate high push-/pull forces, it can operate in varying diameters, cope with varying hole geometries, it can automatically vary speed and pull-/push force with regard to the load, and is gentle to the inside wall of the cavity.

The apparatus has a simple construction since it consists of a number roller elements each having similar design, they may be single standing or involve several mounted one after another.

The individual elements may be mutually displaced relative to each other, and perpendicular to the travel direction/longitudinal axis of the apparatus. The roller elements mounted in one assembly will rotate at the same speed.

BRIEF DESCRIPTION OF THE DRAWINGS

The apparatus according to the present invention will now be described more detailed in the following, with reference to the accompanying schematic drawing, and wherein:

FIG. 1 shows a complete propulsion apparatus able to move inside a cavity/pipe. The rotational direction of the roller elements is also shown.

FIG. 2 shows in three different sections an example of the construction of a roller element, and where the inclined surfaces of roller element is shown, and a sliding element (a bearing, such as a ball bearing) where the outer part may rotate around the peripheral surface of the roller element.

A plurality of roller elements mounted one after another is shown on FIG. 3. The roller elements are drawn in section inside a pipe shaped cavity. The arrows show the compression of the roller elements which makes them forced outwardly towards the inner wall of the cavity.

On FIG. 5 is the roller elements seen from i front when the apparatus includes five or more roller elements mounted one after another. The roller elements are mounted have a mutually displacement of 72° (degrees).

The movement of the apparatus as seen from the side on moving forward is shown on FIG. 6.

FIG. 7 shows the anchoring of the roller element including a spring construction.

Figure 1:
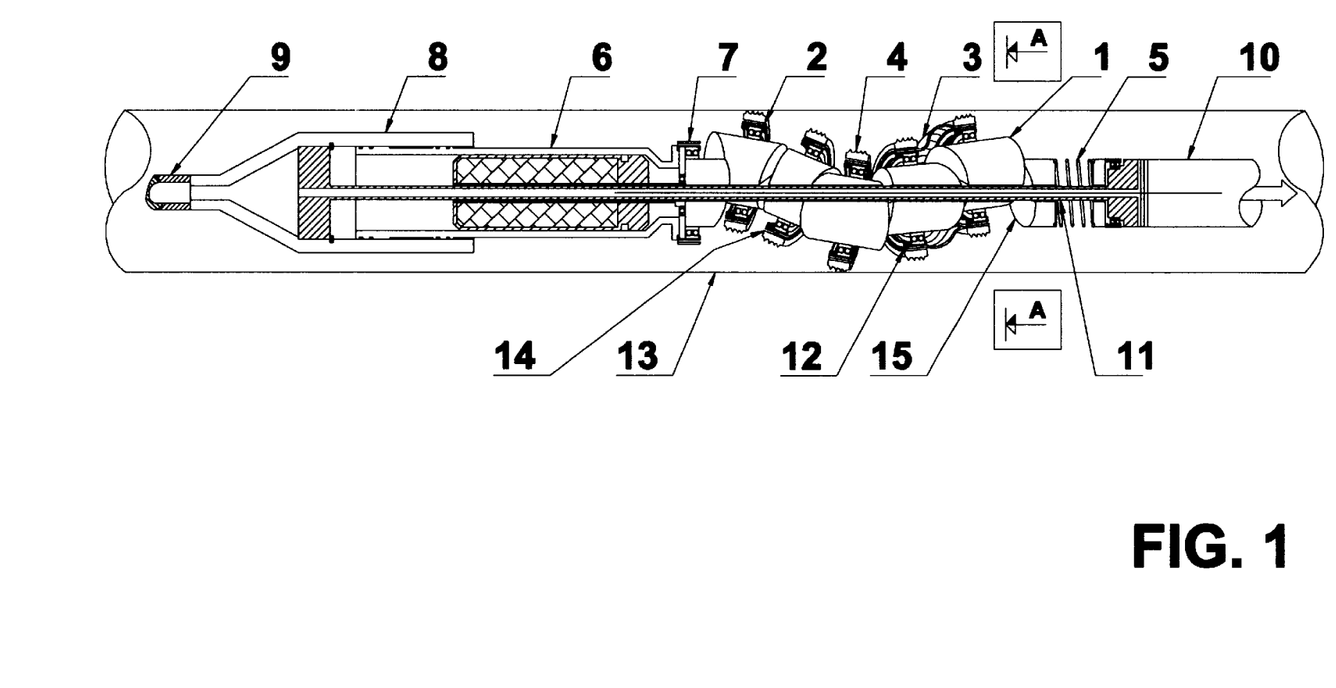
FIG. 1 shows a complete propulsion apparatus able to move inside a cavity/pipe with the rotational direction of the rollers also shown.

Introductory the reference is to the FIGS. 1–2. FIG. 1 shows a complete apparatus for propulsion in a cavity 13, for instance inside a formation of rock ground.

DESCRIPTION OF THE PREFERRED EMBODIMENTS

The apparatus includes a plurality of roller elements 1 which are arranged on line against each other. Each roller element 1 has initially a cylindrical shape where each plane end surface are cut off to establish inclined sliding surfaces 15 with respect to the plane radial surface, as clearly shown on FIG. 2. In the sliding direction the surfaces of two adjacent surfaces comprises mutually corresponding tongue and groove like guiding means for defining the sliding direction of the roller elements as they are compressed axially and thus slide radial away from each other, defined by the angle between the surfaces (see below).

The two facing inclined plane surfaces of two adjacent roller elements, which are positioned against each other, must have the same angle to the longitudinal axis X through the element. This angle is in the range of 0–90°.

When the elements 1 are arranged against each other and having the inclined surfaces mutually towards each other in axial direction, and when this assembly is exposed to axial compression the elements 1 will slide in radial direction. The mutually inclined surfaces 15 on two neighboring elements 1 then will slide along each other in a way so that they slide in radial outward direction.

In accordance to a preferred embodiment, the sliding surfaces of two adjacent roller elements may have a shape so that the elements mutually displaces 100° in opposite directions. Then the central shaft will not be exposed to strain. But however, any internal angle may be chosen.

As shown in FIG. 2, each roller element includes a slot 30 extending through the whole element in axial direction. The slot extends in radial direction from the central shaft 32 and a distance towards the outer wall 33 of the element. Alternatively the slot may be completely open and penetrate the wall 33. The slot 32 is of such dimension that the element may be treaded onto the central through extending shaft 11, and it can be displaced in radial direction outwards and inwards on the shaft limited of the outer extensions of the slot. The central shaft 11 extends through all elements 1.

When the roller elements are axially compressed, the inclined cut sliding surfaces 15 cause the roller elements to press towards the wall of the cavity in which they are operating. When the apparatus "drives" forward in a cavity, the roller elements 1 at the back will push on the roller elements further forward in the assembly, thus causing also they being pressed outwardly towards the inner wall 13 of the cavity. This pressing force increases with the power of which the propulsion apparatus must add to the equipment it moves/transfers. As indicated in FIG. 1 the set of propulsion segments mounted between the motor section 6 and an equipment section 5 (including at equipment section 10) on the other end of the shaft. These sections 6 and 5/10 are used for generating the necessary axial compression of the roller elements so they are pressed radial outward.

With reference to FIG. 2, each roller elements 1 is surrounded by a ring shaped circular sliding element 4 which slides relative to the roller element 1. A ball bearing 2 comprises a stator part 40 which is mounted recessed in a seat in the circular outer surface of the roller element. Thus the sliding element 4 represents a circular shaped rotor part rotating on the outside of the stator 40 via said ball bearing 2.

The sliding element 4 is mounted in such way that it forms an angle to the longitudinal axis X through the roller element. This angle defines the climbing angle (the pitch) of the apparatus during the propulsion, i.e. it decide how fast the apparatus screw itself though the cavity.

All roller elements are produced in a manner so that the stator- and rotor part of the sliding element defines the same (not perpendicular) angle with respect to said central axis X.

In the preferred embodiment where two produced roller elements are mounted facing each other having their slots extending respective 180° in opposite direction, the two sliding elements, viewing the apparatus from one side, face mutually in opposite direction. Since the elements are displaced radially 180° in opposite direction, the diametrical opposite points of the respective rotor parts 4 will establish abutment against the inner wall of the cavity.

When the apparatus, consisting of a number of identical roller elements, are forced together in axial direction, the roller elements will be forced radial outwards in given directions until an point on the bearing-rotor parts form contact towards the cavity inner wall.

An assembly of roller elements including a given angle between the sliding surfaces is shown on FIG. 1. The sliding surfaces are designed in such a way that the two first roller elements, seen from the left, are pushed substantially one way (upwards on the figure), while the two next roller elements move in the opposite direction (downwards the figure). Thus the apparatus is centred, that is to say it covers the complete circumference, 72°×5=360°. To gain such a balance the sum of the mutual displacements between the elements must be 360°. Thus a roller element is turned/displaced a given number of degrees around the shaft 11 with respect to its facing neighbouring roller element, so that the sum of the angle offsets for all elements in the row is said 360°.

When five roller elements are mounted in the row, there is an offset angle of 72° between each roller elements so that the sum of the angle offsets is 360°.

FIG. 1 also shows a motor 6 which by means of a transmission 7 transfers rotational force to the roller elements 1 and rotational counter torque to the outer part of the sliding element 4. The rotational force acts between stator 40 and rotor part of the sliding element 4. The fact that the rotational force operates between the inner and outer part of the sliding element, effects that the rotational torque between the stator and rotor of the motor equalises in the sliding element, and thus the motor has counter torque. If the motor is reversed, the apparatus will move in the opposite direction. The roller elements will normally be rotational fixed to each other simultaneously as they have a degree of freedom from the centre of assembly and outwards to periphery, thus it is sufficient, for affecting the complete assembly of roller elements to rotate, to supply motor force to the roller element being closest to the motor 6 and transmission 7. When the motor is running the apparatus shown in FIG. 1, exhibits a buckling forward movement, and it buckles in all sections simultaneously. The outer part of the sliding segment establishes point by point contact with the inner wall of the cavity and effects an axial directed force so that the apparatus moves forward in desired direction.

When propulsing in a cavity 13 where the diameters are within the minimum and maximum diameters of the propulsion apparatus, all propulsion segments 1 with wear shoes 4a on the outher part of the circular sliding elements or the like, are always contacting the cavity wall. If the assembly includes a separate motor 6 and transmission 7 as shown on the figure, it will it move forward without being rotationally coupled to the central shaft 11. It will then have pulling force at the rear end 8 and pushing force in the front end 10 at the same tie as the roller elements 1 are forced outwards. The design of the propulsion apparatus establish an outside helical shaped channel on the outside of the apparatus, wherein fluid such as liquid can flow through. Fluid can also flow through the central shaft.

As noted it is the mounting of sliding elements on the roller elements that makes the propulsion apparatus move forward when the roller elements rotate about their own axis. The sliding segments are mounted in such a way that they it have an inclined angle on that side of the roller element which is forced towards the wall of the cavity 13. The inclined angle of the sliding element 4 represents the angle by which the rotor part (with external wear shoe) of the sliding element is rolling against the inner wall of the cavity.

According to a preferred embodiment the design of the sliding element may comprise a spring mechanism which is able to displace the sliding element so that the elements angle changes from a maximum angle to a portion being perpendicular to the axis. This mechanism is shown in the FIGS. 7A–C.

FIG. 7 shows the rotor element 4 mounted in its seat surrounding the the roller element 1. In its inclined position the rotor element 4 is clamped by means of a spring construction 50 made of a number of circular and/or wave shaped leaf springs (or for example a coil spring) which is also surrounding the roller element. When the load to be pulled/pushed by the apparatus gradually increases, as indicated with arrows F on the FIG. 7, also the "pull" of the attaching point or surface of rotor part towards the inner wall of the cavity increase. The rotor part will then pivot towards its zero position, where the apparatus rotates only without any propulsion. Just before the apparatus comes to a stand-still the apparatus effects its greatest pulling capability but exhibits its smallest climbing angle/velocity. It can be said that the apparatus continuously changes transmission downward from its maximum climbing angle to its minimum (zero) climbing angle.

Thus the tractive power increases when the spring is compressed so that the previous mentioned climbing angle reduces, the propulsion apparatus will slow down speed and the tractive power increases. If the tractive power is large enough the mentioned angle will be reduced towards zero degrees climbing angle (i.e. perpendicular to the axis), and the propulsion apparatus will be at stand still and push with a constant power. A climbing angle of zero degrees for the rotor part of the sliding element occurs when it is perpendicular to the central shaft 11, and it will look like the rotor part 4 of the sliding element rotates (non slipping) around a shaft without any climbing angle. A possible outer skin or membrane (FIG. 1) can preferably be fixed i.e. in a slot between the inner and outer part (wear shoe 4a) of the sliding elements. Then only the outer wear part will be visible from outside.

Figure 3:
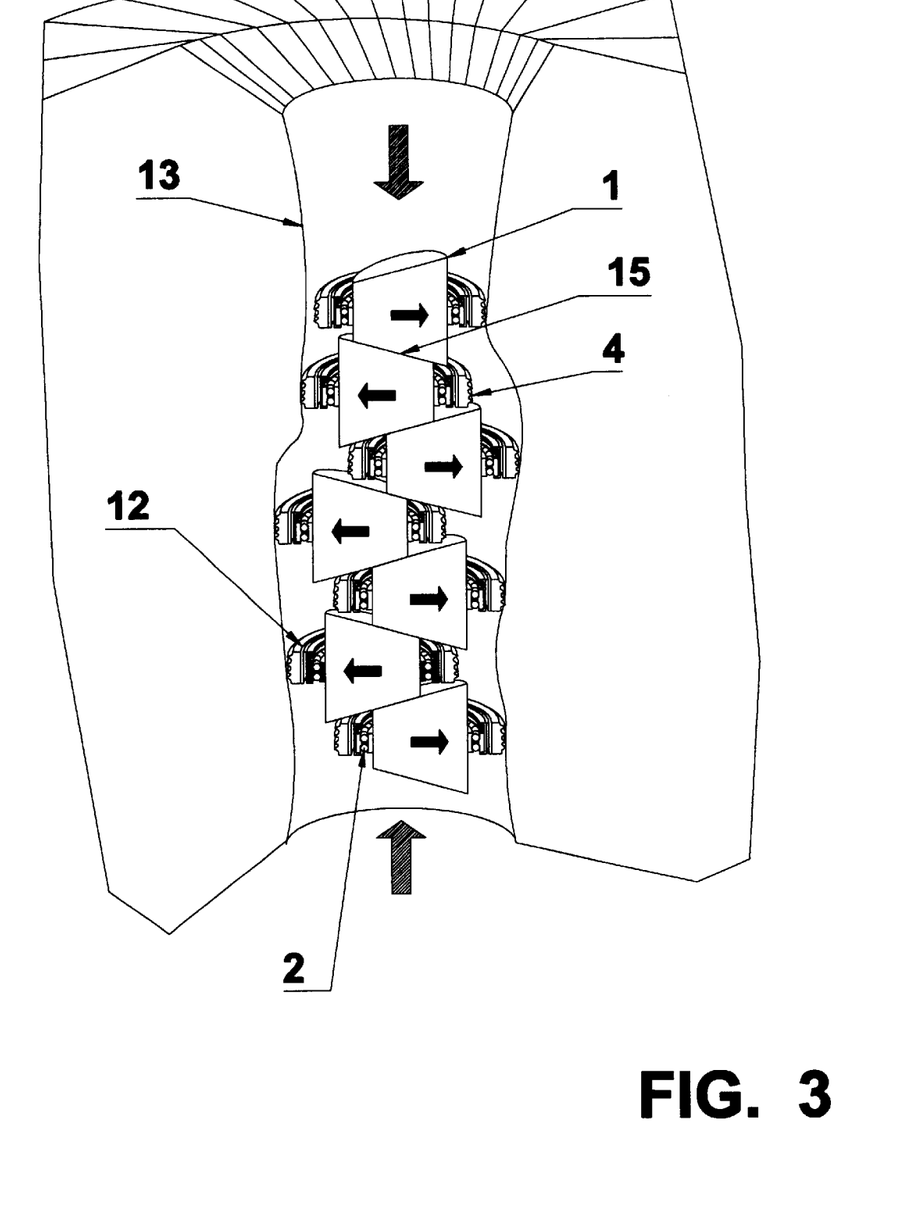
FIG. 3 shows a plurality of rollers mounted one after another inside a pipe shaped cavity.

FIG. 3 shows a plurality of roller elements 1 mounted one after another in an oblong cavity 13. The figure shows how the roller elements 1 presses each other axially and how this pushes all the roller elements 1 outward towards the inner wall of the cavity 13.

Figure 4:
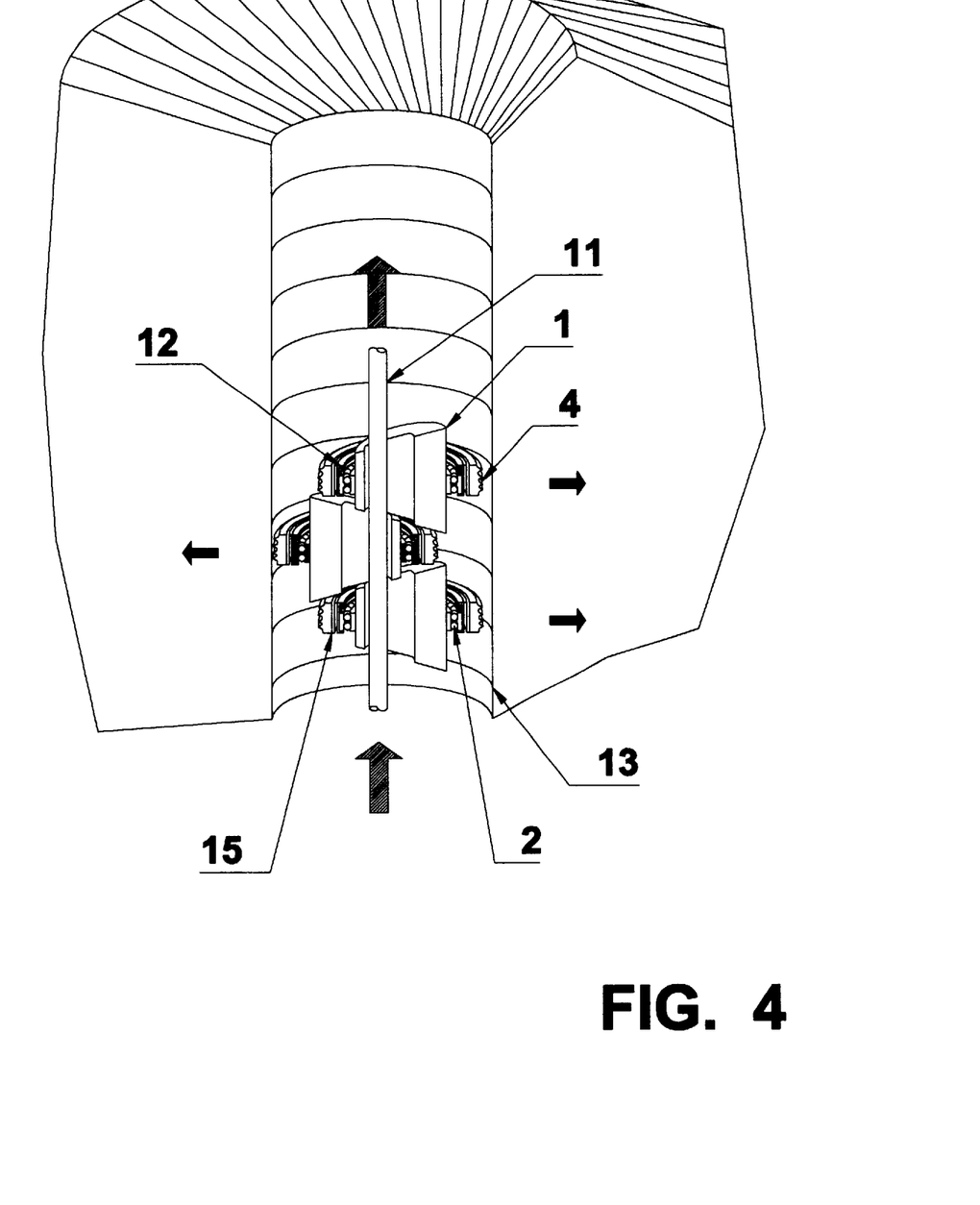
FIG. 4 shows the same as FIG. 3, but includes in addition the central shaft extending through the assembly. The figure also shows the internal oblong radial extending slot, the extension of which defines defines how far a rolling element can be radially displaced with respect to the shaft.

FIG. 4 shows mainly the same as FIG. 3, but this figure shows the central shaft 11. The figure shows that the central shaft is rotationally dis-coupled from the roller elements 1. The figure also shows the restrictions with regards to the maximum and minimum diameter when a straight shaft is conducted through the propulsion apparatus. The roller element 1 can move as far from the centre position around the central shaft 11 as the oblong hole in the roller element 1 permits.

The propulsion apparatus can also be produced without any straight central shaft 11, and then the maximum/minimum diameter of propulsion apparatus may have another ratio.

Figure 5:
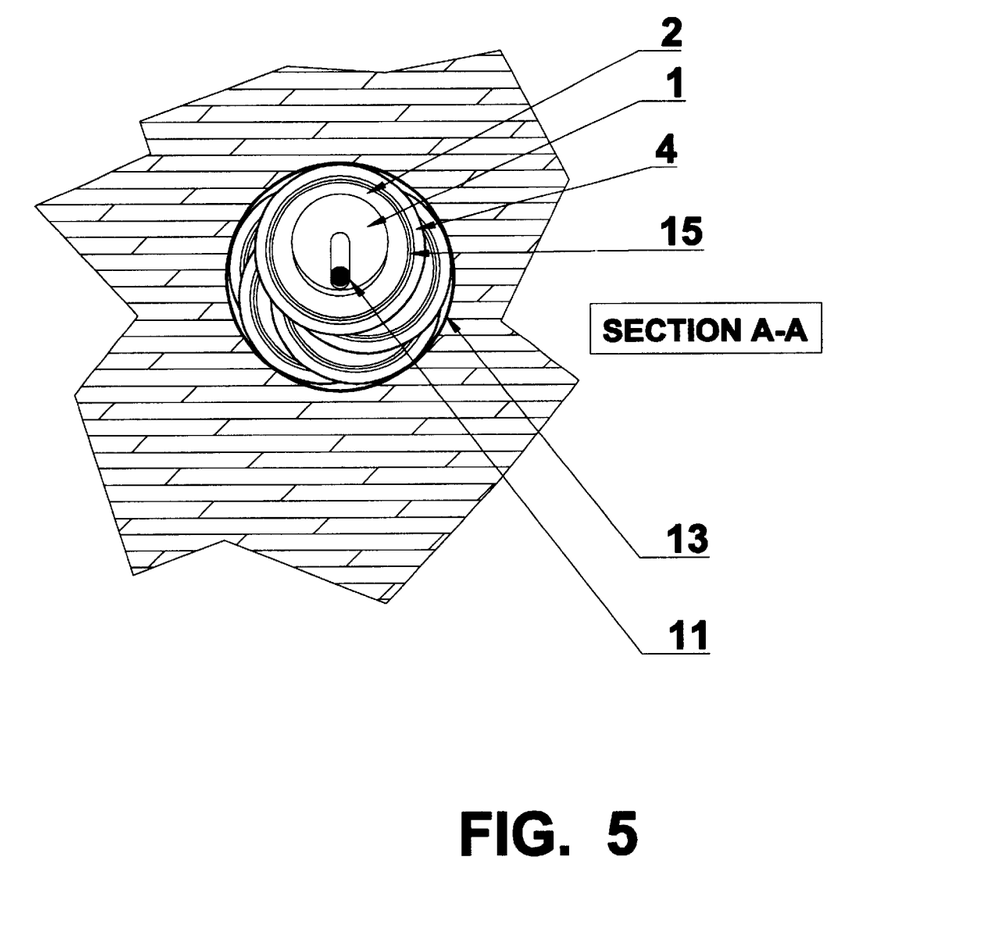
FIG. 5 is a front view of an apparatus that includes five or more rollers mounted one after another with a mutual displacement of 72° (degrees).

FIG. 5 shows a front view of the propulsion apparatus (Section A—A on FIG. 1).

The figure shows that all the roller elements 1 are in contact simultaneously and that a helical shaped channel establishes on the outside of the propulsion apparatus in such way that fluid may pass by outside of the propulsion apparatus.

FIG. 6 shows the movement of the propulsion apparatus as seen from the side when moving/winding forward.

The figure shows a solution were roller elements are mutually connected with a membrane 3, such as rubber, or a metal membrane having a so-called accordion shape. The membrane may be threaded over the complete construction and is attached to the rotor element at each of the roller elements and to the outer shield of the motor. Then the motor will rotate the roller elements and said outer parts will move in the mentioned winding forward movement.

If roller elements of the apparatus is not engaged towards the inner wall of a cavity, then without said membrane the apparatus will lie still. But with a membrane, as mentioned, the apparatus will wind in a forward direction, even if it is lying on a plane surface, because the roller elements are rotationally mutually connected.

Figure 6A:
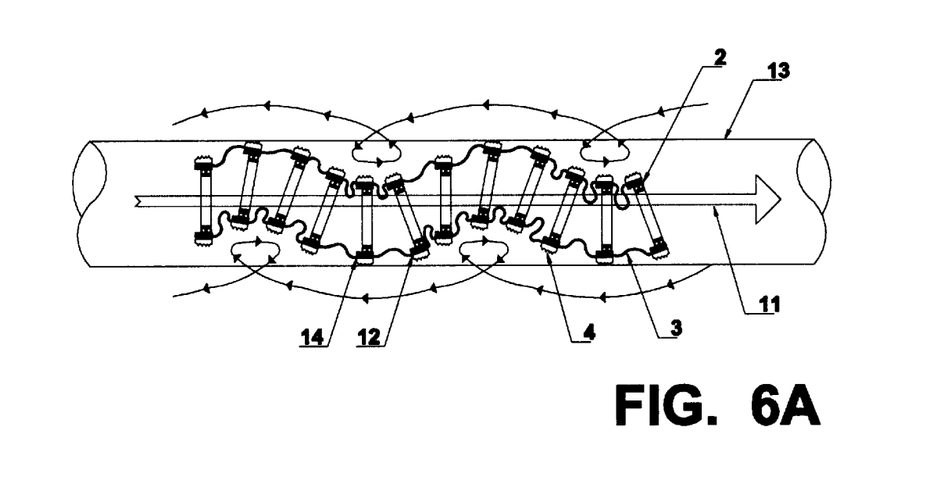
FIG. 6A shows the movement of the apparatus in cross-section within a pipe as seen from the side on moving forward.

FIG. 6A shows a cut through section without roller elements 1. The arrows show the direction of movement of the different elements in the assembly. The big arrow shows the forward travelling direction to the apparatus.

Figure 6B:
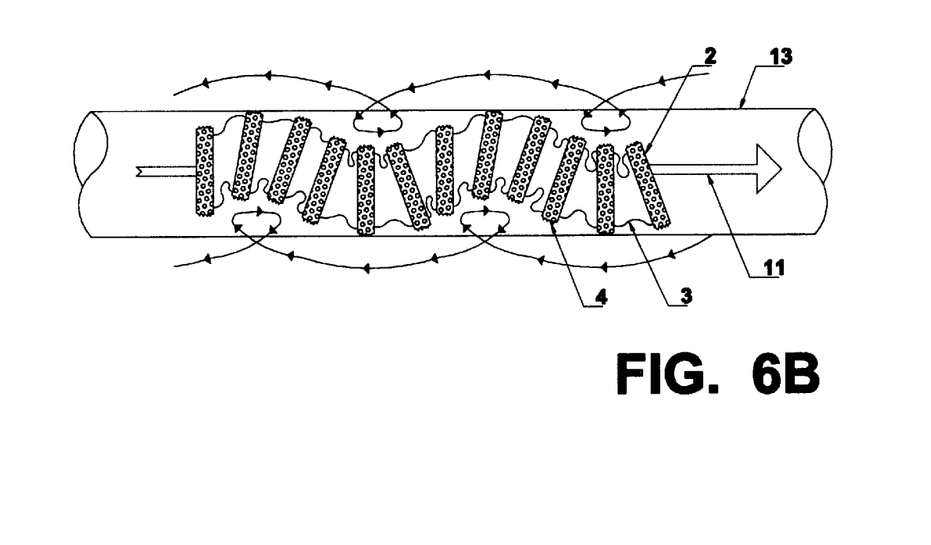
FIG. 6B shows the movement of the apparatus in full view within a pipe as seen from the side on moving forward.

FIG. 6B shows the same as FIG. 6A but here the propulsion apparatus is seen from the outside. The wear shoe 4a of the sliding elements 4 and the membrane 3 is shown. When the membrane 3 is used in this assembly, the outer parts of the sliding elements 4 are mutually rotatably connected.

The figure at the bottom shows the same as the uppermost figure, but here the propulsion apparatus is seen from the outside. The wear shoe 4a of the sliding elements 4 and the membrane 3 is shown. When the membrane 3 is used in this assembly the outer parts of the sliding elements 4 are mutually rotatably connected.

By the way, if the sliding element has its own motor drive, the inner driving unit will rotate and push the conical parts so that point of contact of the outer ring against the wall of the cavity moves forward in a helical shape.

The membrane will also protect the sliding elements 4 from influence of dirt and particles as well as the sliding elements can be surrounded by oil for lubrication and for cooling.

Figures 8A, 8B:
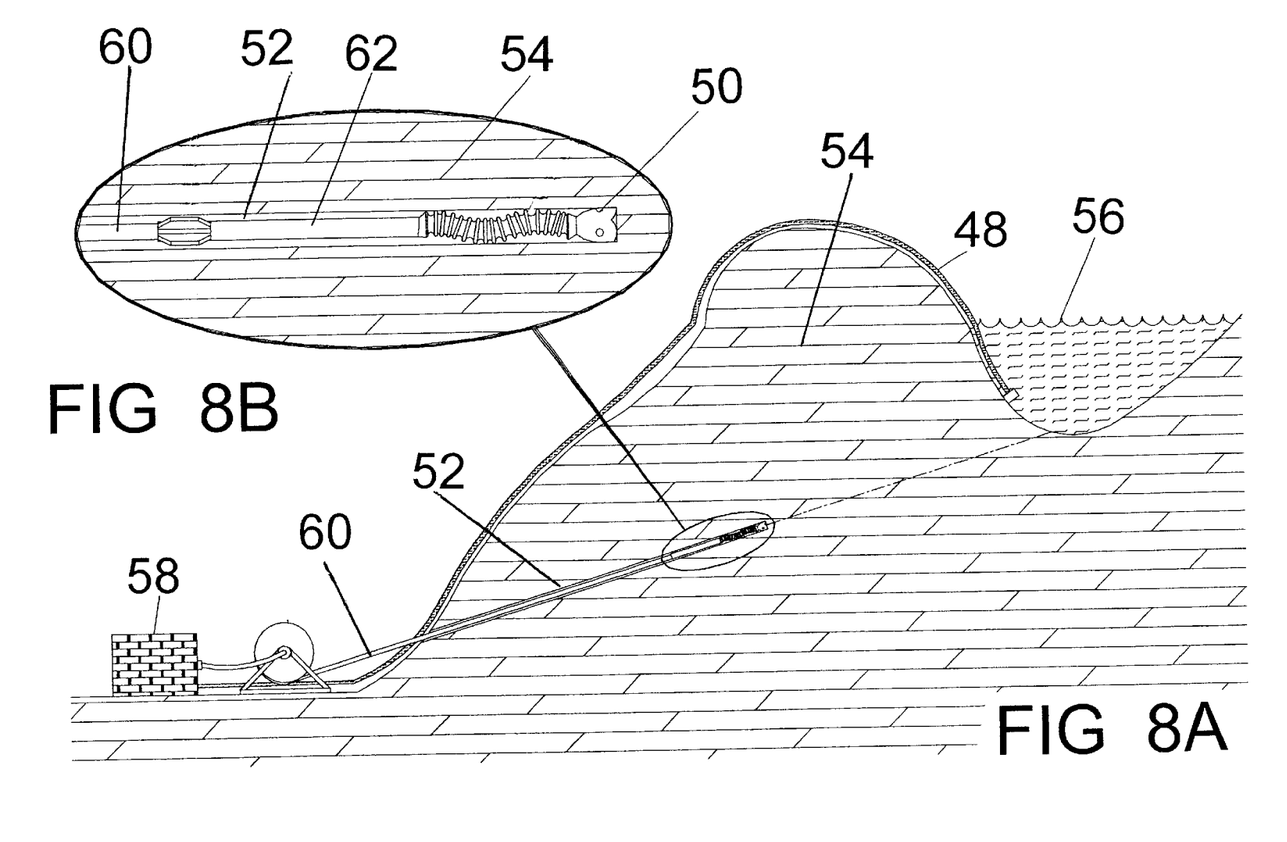
FIG. 8 shows an example in practical use for the apparatus of the invention

FIGS. 8A and B show a possible way of using this propulsion apparatus when drilling holes in rock formations 54 for instance a water reservoir 56 where a hose or pipe 48 for the supply of water needs replacement. As illustrated, a drill bit 50 is mounted on the forward end of the apparatus for drilling into the rock formation 54 at an upward angle. The apparatus is also connected to a hydraulic motor 62 at the opposite end. The motor 62 is, in turn, connected with a directional tool mounted at the end of a pipe or hose 60. The pipe or hose 60 extends to a drum that is operatively connected to a hydraulic generator 58 that, as is known, supplies hydraulic fluid through the pipe or hose 60 to the hydraulic motor 62 for operating the drill bit 50.

This propulsion apparatus can be produced in all sizes, and used for operation in all elongated cavities where tasks that require propulsion are to be effected.

The invention shall not be restricted by the examples of its embodiment specified above, in that many variations are possible within the range of the idea of the invention as defined in the claims.

What is claimed is:

1. An apparatus comprising
    a plurality of rollers disposed on and longitudinally of a common axis, each said roller having a cylindrical shape and a pair of plane end sliding surfaces, each said surface being disposed at an inclined angle to said common axis and in abutment with an end sliding surface of an adjacent roller; and
    a plurality of ring shaped sliding elements, each said sliding element being mounted at an angle peripherally on and about a respective one of said rollers for rotation relative to said respective roller;
    whereby upon imposition of an axial compressive force thereon, said rollers slide relative to each other radially of said common axis to engage said sliding elements thereon with a surrounding wall.

2. An apparatus as set forth in claim 1 further comprising a shaft on said common axis, each said roller having a radially extending slot passing therethrough and sized to receive said shaft with a clearance to permit said roller to move radially of said shaft.

3. An apparatus as set forth in claim 1 further comprising guiding means receiving a sliding surface of an adjacent roller for guiding said adjacent roller radially of said common axis.

4. An apparatus as set forth in claim 1 further comprising a membrane disposed over and receiving said rollers and said sliding elements therein.

5. An apparatus as set forth in claim 1 further comprising drive means for rotating said sliding elements.

6. An apparatus as set forth in claim 1 wherein each said roller is circumferentially displaced relative to an adjacent roller to center said rollers within a cavity.

7. An apparatus as set forth in claim 6 wherein each said roller is circumferentially displaced relative to an adjacent roller at an angle of 72° and the total circumferential displacement of said rollers is 360°.

8. An apparatus as set forth in claim 1 wherein each sliding element includes an inner ring mounted on a respective roller at an inclined angle, an outer ring disposed about said inner ring and a plurality of ball bearings between said rings to allow rotation of said outer ring relative to said inner ring.

9. An apparatus as set forth in claim 8 wherein said inner ring on a respective roller is movable between said inclined angle and a perpendicular position relative to said roller and which further includes a spring mounted between said inner ring and said respective roller for biasing said inner ring from said perpendicular position into said inclined angle.

10. An apparatus for propulsion through a pipeline comprising
    a plurality of rollers disposed on and longitudinally of a common axis, each said roller having a cylindrical shape and a pair of plane end sliding surfaces, each said surface being disposed at an inclined angle to said common axis and in abutment with an end sliding surface of an adjacent roller;

a plurality of ring shaped sliding elements, each said sliding element being mounted at an angle peripherally on and about a respective one of said rollers for rotation relative to said respective roller and for contact with an inner wall of the pipeline; and drive means for rotating at least one of said rollers and said sliding elements whereby upon imposition of an axial compressive force thereon, said rollers slide relative to each other radially of said common axis to engage said sliding elements thereon with the inner wall of the pipeline.

* * * * *

UNITED STATES PATENT AND TRADEMARK OFFICE
CERTIFICATE OF CORRECTION

PATENT NO. : 6,761,233 B1
APPLICATION NO. : 09/937104
DATED : July 13, 2004
INVENTOR(S) : Aadland It is certified that error appears in the above-identified patent and that said Letters Patent is hereby corrected as shown below:

PLEASE DELETE TITLE PAGE AND COLUMNS 1-8 AND INSERT THE ATTACHED TITLE PAGE, AND COULMNS 1-8

Signed and Sealed this

Twenty-seventh Day of March, 2007

JON W. DUDAS
*Director of the United States Patent and Trademark Office*

United States Patent
Aadland (10) Patent No.: US 6,761,233 B1
(45) Date of Patent: Jul. 13, 2004

(54) APPARATUS FOR PROPULSION IN ELONGATED CAVITIES (75) Inventor: Harald Aadland, Nesttun (NO)

(73) Assignee: AA Technology AS, Nesttun (NO)

(*) Notice: Subject to any disclaimer, the term of this patent is extended or adjusted under 35 U.S.C. 154(b) by 0 days.

(21) Appl. No.: 09/937,104

(22) PCT Filed: Mar. 22, 2000

(86) PCT No.: PCT/NO00/00104
§ 371 (c)(1),
(2), (4) Date: Jan. 4, 2002

(87) PCT Pub. No.: WO00/57100
PCT Pub. Date: Sep. 28, 2000

(30) Foreign Application Priority Data

Mar. 22, 1999 (NO) .................... 1999-1368

(51) Int. Cl.⁷ ................................ E21B 4/00
(52) U.S. Cl. .................. 175/97; 175/230; 166/217; 166/241.3
(58) Field of Search ................. 175/97, 98, 230; 166/217, 241.3, 174, 50

(56) References Cited

U.S. PATENT DOCUMENTS 4,046,204 A * 9/1977 Takaoka et al.
4,580,642 A * 4/1986 Gosch
5,794,703 A * 8/1998 Newman et al.
6,031,371 A * 2/2000 Smart
6,112,809 A * 9/2000 Angle
6,453,999 B1 * 9/2002 Reinholdt
6,464,003 B1 * 10/2002 Bloom et al.

* cited by examiner

Primary Examiner—Roger Schoeppel
(74) Attorney, Agent, or Firm—Francis C. Hand; Carella, Byrne, Bain et al.

(57) ABSTRACT

An apparatus for propulsion inside an oblong cavity, such as pipes or the like, is disclosed. The apparatus is characterized by comprising a central rotating part comprising an inclined wheel construction arranged to thrust towards the inner wall of the cavity, in that the central rotating part comprises a plurality of roller elements (1) arranged in a row against each other, and two adjacent roller elements (1) in the row comprise mutually adjacent inclined sliding faces (15), so that each element is arranged to be displaced in radial direction outward from a central shaft (11) due to axial compression of the unit of inclined roller elements, until the corresponding wheel construction abuts the inner wall of the cavity, and that the wheel construction includes that a bearing construction is arranged enclosing around each roller element, and being rotatably independent of its corresponding roller element, and is mounted at an inclined angle defining the climbing angle of the apparatus during propulsion, and further the apparatus comprises drive means for rotation of the rotatable part. It is an essential feature of the apparatus that it comprises internal rotational counter force, and that automatic transmission may be provided.

10 Claims, 8 Drawing Sheets

APPARATUS FOR PROPULSION IN ELONGATED CAVITIES

The present invention concerns an apparatus for propulsion in elongated cavities and pipes.

By elongated cavities is meant pipes, ducts, drilled or mined holes in rock, or wells which are drilled with or without casing in the ground (oil related holes), in metals or other materials.

According to the invention, the apparatus is used when inspection or different kinds of work are performed in such cavities. According to the invention, the apparatus may be used to force forward the equipment for boring a hole, but can also be used for pulling equipment through the hole.

In such cavities, pipes and ducts, where it is not possible to use people there is often need for inspection, service, maintenance and other work to be done. It might also be necessary to increase the propelling power on the drilling equipment which is drilling holes/wells.

In vertical holes, for example in oil related wells, it is normal to pull the necessary equipment down into the well by means of gravity, if it is not pushed downward by means of a pipe. In horizontal holes or pipes where it is not possible to utilize gravity, an apparatus for pulling or pushing is required for the equipment to be transported. Different hydraulic methods to pump forward equipment have also been tested. The methods which are based on pipes for transporting the equipment, require a lot of space and personnel to run it all day and night, and further the transportation speed is relatively low.

From British patent GB-1,328,886 a vehicle coupled to a coiled tubing is known, thus enabling the vehicle to pull or push the coiled tubing.

From British patent patent GB-2,196,715 a device which is driven forward by liquid or gas pressure through a pipeline is known.

From GB-2,280,970 a vehicle having motor powered wheels is known, but where propulsion may be provided also by means of chain and sprocket wheels.

From U.S. Pat. No. 4,941,511 a joint separated vehicle is known, where one part includes the energy source and the other part includes a motor connected to the driving wheels. A similar device is known from GB patent specification 2,122,713.

From EP patent specification 0,461,964 a vehicle where propulsion is generated by means of motor driven belts or wheels is known.

In DE patent specification 3,206,033 there is shown a vehicle where the propulsion is provided by means of an obliqued wheel, the wheel axis of which is mounted eccentric on a shaft which is positioned centric of the vehicle. The wheel is therefore aligned mainly crosswise to the traction direction. This eccentricity causes the wheel to be in contact with the pipe wall and the contact point moves as the shaft is rotated. The oblique position of the wheel causes the movement of the contact point to also generate propulsion. Further, the vehicle is also equipped with radially directed wheels which abut the pipe wall for centering the vehicle inside the pipe line. Further, the vehicle is equipped with radially directed wheels which abut the pipe wall for centering the vehicle inside the pipe, and for giving countertorque to the drive motor.

From SU patent 481,784 a vehicle is known where several crosswise spring loaded wheels are mounted adjacent the surface of the vehicle so that the wheels abut the pipe wall and centers the vehicle within the pipe line. When the vehicle rotates around it's own axis, the wheels cause a propulsion corresponding to the wheel angle. This apparatus needs counter force torque.

From Norwegian Patent no. 178,276 a pipe tractor arranged to move within canals and pipes is known, in that the end portions of the tractor is mounted and equipped with spring loaded arms to which crosswise wheels are mounted, and the wheels abut the inner surface of the pipe, so that side force affecting the wheels provides for propulsion of the vehicle when the end portions are rotating. The end portions rotate in opposite directions related to each other, and one of the ends acts as counter torque for the other end, and visa versa.

From International patent PCT/GB93/0111 a down hold tool is known, for providing rotary support of a downhole assembly in which the tool is incorporated. The tool also converts rotary contact with the wellbore into a longitudinal force which turns the assembly along the wellbore. The tool comprises a stabilizer including rollers, wherein the roller axes are skewed to be tangential to a notional helix, such that the natural path of roller contact with the wellbore has a longitudinal component in addition to the usual circumferential path. The tool can be used on drill strings and in downhole assemblies with motor. The tool may also pull a cable supplying the tool with electricity/hydraulic power for the propulsion machinery.

The pulling/pushing apparatus of today are encumbered with a lot of disadvantages. Firstly they are very complex, they have a limited operation range and they are produced for dedicated actions/tasks which they are intended to execute. There are also strict requirements regarding the surroundings in which they are used.

It is an object of the invention to prepare a new and improved propulsion apparatus for transporting (pushing/pulling) through pipes/cavities.

Further, it is an object to produce an apparatus which may effect an increased pulling power, independent of the design of the cavity, and reduced demands to the strength/toughness or the inside wall of the pipe/cavity.

A further object is to produce an apparatus that can work without any counter torque. Finally, it is an object to produce a shorter propulsion apparatus with lower weight, therefore being easier to handle, and may carry more equipment for each trip.

Briefly, the invention provides an apparatus comprised of a plurality of rollers disposed on and longitudinally of a common axis with each roller having a cylindrical shape and a pair of plane end sliding surfaces. Each end surface is disposed at an inclined angle to the common axis and is in abutment with an end sliding surface of an adjacent roller. In addition, a plurality of ring shaped sliding elements are provided with each sliding element being mounted at an angle peripherally on and about a respective one of the rollers for rotation relative to the respective roller. Thus, upon imposition of an axial compressive force thereon, the rollers slide relative to each other radially of the common axis to engage the sliding elements thereon with a surrounding wall.

The apparatus may include a shaft on the common axis while each roller has a radially extending slot passing therethrough and sized to receive the shaft with a clearance to permit the roller to move radially of the shaft.

Guiding means are also provided on each roller for receiving a sliding surface of an adjacent roller for guiding the adjacent roller radially of the common axis.

A membrane may also be disposed over the rollers and the sliding elements to protect these elements from dirt and to allow the sliding elements to be lubricated and/or cooled.

A drive means is also provided for rotating the sliding elements and/or the rollers.

With this invention, an apparatus with a simple construction is designed, and which is easy to run and covers a large working area, and more specific, the apparatus may operate in ducts having very variable cross section and variable diameter, that is to say within the working range of the apparatus within the maximum and minimum diameters for its operation. The apparatus involves a simple design so that different sizes of it may pull/push in holes having diameter ranges of millimeter to several meters.

The apparatus is further designed for automatic adjustment of the pulling force, independent of the design of the cavity. This occurs when the traction roller (the sliding element), against the action of a spring force, changes its orientation from its maximum angle position relative to the longitudinal axis of the apparatus, to the position where it is perpendicular to the longitudinal axis. Then the apparatus rotates with the wheels running so the propulsion of the apparatus becomes zero. Thus, if the mass of the tool to be pulled and/or be pushed becomes too large, one avoids the apparatus being exposed to overload. The contact point of the traction roller towards the pipe wall moves in a non-slipping revolving movement around the pipe wall.

It has no consequences either the cavity is angular or round, and the diameter may be changed continuously as long as it stays within the maximum/minimum operation diameter of the apparatus. In contrast to the previously known traction mechanisms, which require uniform holes, this apparatus can go into any kind of holes.

The device according to the invention, does not need any counter torque, due to the fact that its motor rotational torque has an internal counter force within the device.

The apparatus may generate high push/pull forces, it can operate in varying diameters, cope with varying hole geometries, it can automatically vary speed and pull/push force with regard to the load, and is gentle to the inside wall of the cavity.

The apparatus has a simple construction since it consists of a number of rollers each having similar design, they may be single standing or involve several mounted one after another.

The individual elements may be mutually displaced relative to each other, and perpendicular to the travel direction/longitudinal axis of the apparatus. The rollers mounted in one assembly will rotate at the same speed.

The apparatus according to the present invention will now be described more detailed in the following, with reference to the accompanying schematic drawing, and wherein:

FIG. 4 shows the same as FIG. 3, but includes the central shaft extending through the assembly.

FIG. 1 shows a complete apparatus for propulsion in a cavity 13, for instance inside a formation of rock ground.

The apparatus includes a plurality of rollers or roller elements 1 which are arranged on line against each other along a common axis. Each roller element 1 has a cylindrical shape where each plane end surface is cut off to establish an inclined sliding surface 15 with respect to the plane radial surface, as clearly shown in each of FIGS. 2A, 2B and 2C. In the sliding direction, the surfaces of two adjacent surfaces comprise mutually corresponding tongue and groove like guiding means for defining the sliding direction of the roller elements 1 as they are compressed axially and thus slide radially away from each other, defined by the angle between the surfaces (see below).

The two facing inclined plane surfaces of two adjacent roller elements, which are positioned against each other, must have the same angle to the longitudinal axis X through the element. This angle is in the range of 0–90°.

When the roller elements 1 are arranged against each other and have the inclined surfaces mutually towards each other in the axial direction, and when this assembly is exposed to axial compression, the roller elements 1 will slide in a radial direction. The mutually inclined surfaces 15 on two neighboring elements 1 then will slide along each other in a way so that they slide in a radially outward direction.

In accordance to a preferred embodiment, the sliding surfaces of two adjacent roller elements may have a shape so that the elements mutually displace 180° in opposite directions. Then the central shaft will not be exposed to strain. But however, any internal angle may be chosen.

Figure 2A:
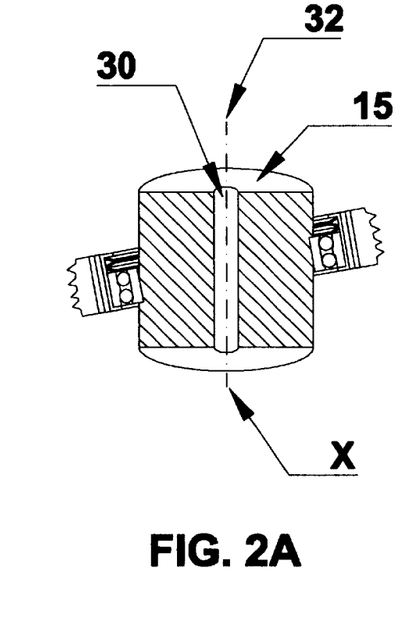
FIG. 2A shows a first cross-sectional view of an example of the construction of a roller and a sliding element such as a ball bearing where the outer part may rotate around the peripheral surface of the roller.
Figure 2B:
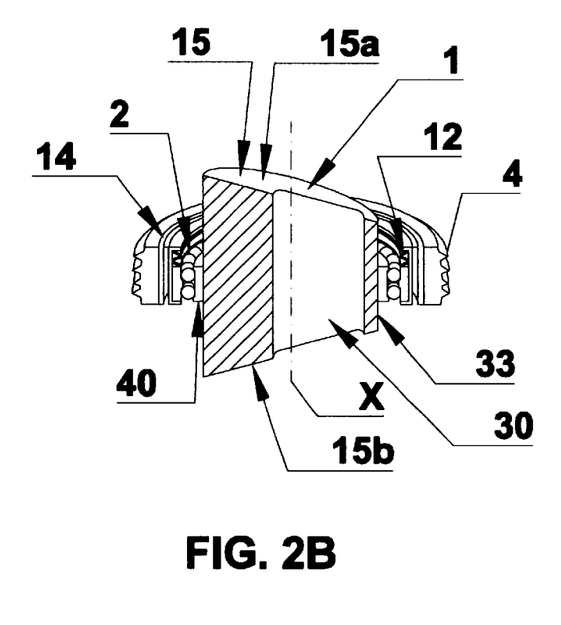
FIG. 2B shows a second cross-sectional view of the roller and sliding element of FIG. 2A.
Figure 2C:
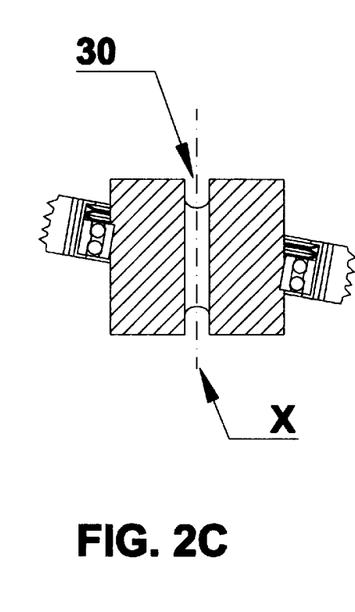
FIG. 2C shows a third cross-sectional view of the roller and sliding element of FIG. 2A.

As shown in FIGS. 2A, 2B and 2C, each roller element 1 includes an oblong slot 30 extending through the whole element in the axial direction. The slot extends in a radial direction from the central shaft 32 and a distance towards the outer wall 33 of the element. Alternatively, the slot may be completely open and penetrate the wall 33. The slot 32 is of such dimension that the roller element 1 may be treaded onto the central through extending shaft 11, and can be displaced in a radial direction outwards and inwards on the shaft limited only by the outer extensions of the slot. The central shaft 11 extends through all elements 1.

When the roller elements 1 are axially compressed, the inclined end sliding surfaces 15 cause the roller elements 1 to press towards the wall of the cavity in which they are operating. When the apparatus drives forward in a cavity, the roller elements 1 at the back will push on the roller elements further forward in the assembly, thus causing these elements to be pressed outwardly towards the inner wall 13 of the cavity. This pressing force increases with the power the propulsion apparatus must add to the equipment it moves/transfers. As indicated in FIG. 1 the set of propulsion segments is mounted between a motor section 6 and an equipment section 5 (including an equipment section 10) on the other end of the shaft. These sections 6 and 5/10 are used for generating the necessary axial compression of the roller elements 1 so they are pressed radially outward.

With reference to FIGS. 2A, 2B and 2C, each roller element 1 is surrounded by a ring shaped circular sliding element 4 which slides relative to the roller element 1. Each sliding element 4 is formed by a ball bearing 2 that comprises a stator part 40 which is mounted in a recessed manner in a seat in the circular outer surface of the roller element 1 and a circular shaped rotor part rotating on the outside of the stator 40 via the ball bearing 2. A wear shoe is also mounted on the outside of the rotor part to engage the cavity wall.

The sliding element 4 is mounted in such a way that it forms an angle to the longitudinal axis X through the roller element 1. This angle defines the climbing angle (the pitch) of the apparatus during propulsion, i.e. the angle determines how fast the apparatus screws itself through the cavity.

All roller elements are produced in a manner so that the stator and rotor part of the sliding element 4 defines the same (not perpendicular) angle with respect to the central axis X.

In the preferred embodiment where two roller elements 1 are mounted in facing relation to each other with their guide slots extending 180° in opposite directions, the two sliding elements 4, viewing the apparatus from one side, face in mutually opposite directions. Since the elements are displaced radially 180° in opposite directions, the diametrical opposite points of the respective rotor parts 4 will establish abutment against the inner wall of the cavity.

When the apparatus, consisting of a number of identical roller elements 1, is compressed in the axial direction, for example, as indicated in FIG. 3, the roller elements 1 will be forced radially outwards in given directions until a point on the bearing-rotor parts contacts the cavity inner wall.

An assembly of roller elements including a given angle between the sliding surfaces is shown in FIG. 1. The sliding surfaces are designed in such a way that the two first roller elements, seen from the left, are pushed substantially one way (upwards in the Figure), while the two next roller elements move in the opposite direction (downwards in the Figure). Thus, the apparatus is centered, that is to say it covers the complete circumference, 72°×5=360°. To gain such a balance, the sum of the mutual displacements between the elements must be 360°. Thus, a roller element 1 is turned/displaced a given number of degrees around the shaft 11 with respect to its facing neighboring roller element 1, so that the sum of the angle offsets for all elements in the row is 360°.

When five roller elements 1 are mounted in the row, there is an offset angle of 72° between each pair of adjacent roller elements 1 so that the sum of the angle offsets is 360°.

FIG. 1 also shows a motor 6 which by means of a transmission 7 transfers rotational force to the roller elements 1 and rotational counter torque to the outer part of the sliding elements 4. The rotational force acts between stator 40 and rotor part of the sliding element 4. The fact that the rotational force operates between the inner and outer part of each sliding element 4, causes the rotational torque between the stator and rotor of the motor to equalize in the sliding element, and thus the motor has counter torque. If the motor is reversed, the apparatus will move in the opposite direction. The roller elements will normally be rotationally fixed to each other simultaneously as they have a degree of freedom from the center of assembly and outwards to the periphery. Thus, it is sufficient, to cause rotation of the complete assembly of roller elements 1, to supply motor force only to the roller element 1 closest to the motor 6 and transmission 7. When the motor is running, the apparatus shown in FIG. 1 exhibits a buckling forward movement, and it buckles in all sections simultaneously. The outer part of the sliding segment establishes point by point contact with the inner wall of the cavity and effects an axially directed force so that the apparatus moves forward in the desired direction.

When moving in a cavity 13 where the diameters are within the minimum and maximum diameters of the propulsion apparatus, all roller elements 1 with wear shoes 4a on the outer part of the circular sliding elements 4 are always in contact with the cavity wall. If the assembly includes a separate motor 6 and transmission 7 as shown on the Figure, the assembly will move forward without being rotationally coupled to the central shaft 11. The assembly will then have a pulling force at the rear end 8 and a pushing force in the front end 10 at the same time as the roller elements 1 are forced outwards. The design of the propulsion apparatus establishes an outside helical shaped channel on the outside of the apparatus, wherein fluid such as liquid can flow through. Fluid can also flow through the central shaft 11.

As noted, it is the mounting of the sliding elements 4 on the roller elements 1 that makes the propulsion apparatus move forward when the roller elements 1 rotate about their own axes. The sliding segments 4 are mounted in such a way to have an inclined angle on that side of the roller element 1 which is forced towards the wall of the cavity 13. The inclined angle of the sliding element 4 represents the angle by which the rotor part (with external wear shoe 4a) of the sliding element 4 rolls against the inner wall of the cavity.

According to a preferred embodiment, the design of the sliding element 4 may comprise a spring mechanism which is able to displace the sliding element 4 so that the element angle changes from a maximum angle to a position perpendicular to the axis of the roller element 1 on which the sliding element 4 is mounted. This mechanism is shown in FIGS. 7A-C.

Figure 7A:
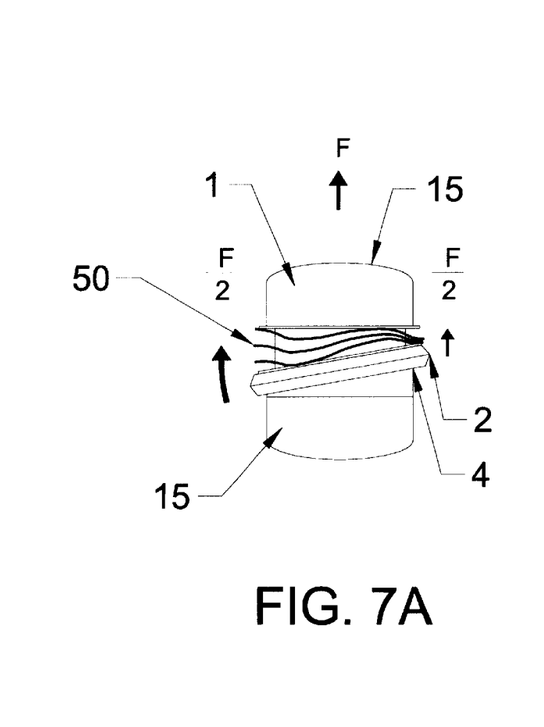
FIG. 7A shows the mounting of a roller including a spring construction.
Figure 7B:
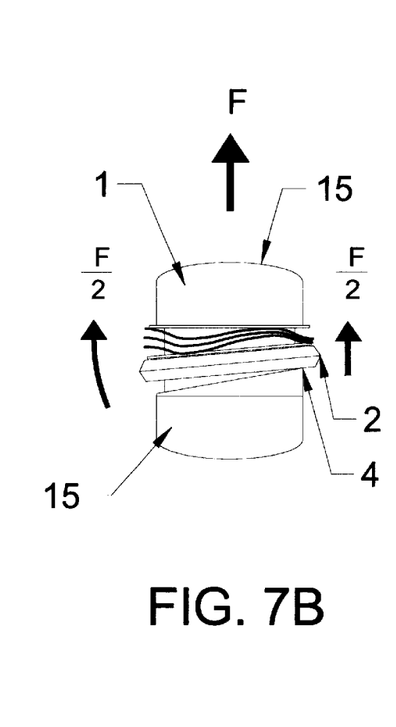
FIG. 7B shows the position of the roller during movement of the roller relative to the spring construction in use.
Figure 7C:
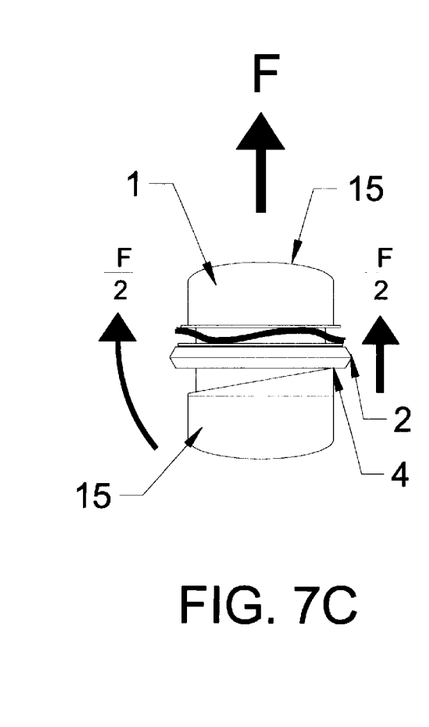
FIG. 7C shows a further position of the roller during movement of the roller relative to the spring construction in use.

FIG. 7A shows the rotor element 4 mounted in its seat surrounding the roller element 1. The rotor element 4 is clamped in an inclined position by means of a spring construction 80 made of a number of circular and/or wave shaped leaf springs (or for example a coil spring) which surround the roller element 1. When the load to be pulled/pushed by the apparatus gradually increases, as indicated with arrows F, the pull of the attaching point or surface of the rotor part towards the inner wall of the cavity increases. The rotor part will then pivot through the position shown in FIG. 7B towards its zero position shown in FIG. 7C, where the apparatus rotates only without any propulsion. Just before the apparatus comes to a stand-still, the apparatus effects its greatest pulling capability but exhibits its smallest climbing angle/velocity. It can be said that the apparatus continuously changes transmission downward from this maximum climbing angle to its minimum (zero) climbing angle.

Thus, the tractive power increases when the spring is compressed so that the previously mentioned climbing angle reduces, the propulsion apparatus will slow down while the tractive power increases. If the tractive power is large enough, the mentioned angle will be reduced towards zero degrees climbing angle (i.e. perpendicular to the axis), and the propulsion apparatus will be at a stand still and push with a constant power. A climbing angle of zero degrees for the rotor part of the sliding element occurs when it is perpendicular to the central shaft 11, and it will look like the rotor part 4 of the sliding element rotates (non slipping) around a shaft without any climbing angle. A possible outer skin or membrane (FIG. 1) can preferably be fixed i.e., in a slot between the inner and outer part (wear shoe 4a) of the sliding elements 4. Then only the outer wear part will be visible from outside.

FIG. 3 shows a plurality of roller elements 1 mounted one after another in an elongated cavity 13. The Figure shows how the roller elements 1 press each other axially and how this pushes all the roller elements 1 outward towards the inner wall of the cavity 13.

FIG. 4 shows mainly the same as FIG. 3, but this Figure shows the central shaft 11. The Figure shows that the central shaft 11 is rotationally dis-coupled from the roller elements 1. The Figure also shows the restrictions with regards to the maximum and minimum diameter when a straight shaft is passed through the propulsion apparatus. The roller element 1 can move as far from the center position around the central shaft 11 as the oblong slot 12 in the roller element 1 permits.

The propulsion apparatus can also be produced without any straight central shaft 11, and then the maximum/minimum diameter of propulsion apparatus may have another ratio.

FIG. 5 shows a front view of the propulsion apparatus (section A—A on FIG. 1). The Figure shows that all the roller elements 1 are in contact simultaneously and that a helically shaped channel is formed on the outside of the propulsion apparatus in such way that fluid may flow by on the outside of the propulsion apparatus.

FIGS. 6A and 6B show the movement of the propulsion apparatus as seen from the side when moving/winding forward. As shown, the roller elements 1 are mutually connected with a membrane 3, such as rubber, or a metal membrane having a so-called accordion shape. The membrane 3 may be threaded over the complete construction and is attached to the rotor elements 1 at each of the roller elements and to the outer shield of the motor. Then, the motor will rotate the roller elements and the outer parts will move in the mentioned winding forward movement.

If the roller elements 1 of the apparatus are not engaged towards the inner wall of a cavity, then without the membrane 3 the apparatus will lie still. But with a membrane, as mentioned, the apparatus will wind in a forward direction, even if it is lying on a plane surface, because the roller elements 1 are rotationally mutually connected.

FIG. 6A shows a cut through section without roller elements 1. The arrows show the direction of movement of the different elements in the assembly. The big arrow shows the forward travelling direction to the apparatus.

FIG. 6B shows the same as FIG. 6A, but here the propulsion apparatus is seen from the outside. The wear shoe 4a of the sliding elements 4 and the membrane 3 is shown. When the membrane 3 is used in this assembly, the outer parts of the sliding elements 4 are mutually rotatably connected.

By the way, if the sliding element has its own motor drive, the inner driving unit will rotate and push the conical parts so that point of contact of the outer ring against the wall of the cavity moves forward in a helical shape.

The membrane 3 will also protect the sliding elements 4 from the influence of dirt and particles. Also, the sliding elements 4 can be surrounded by oil for lubrication and for cooling.

FIGS. 8A and B show a possible way of using this propulsion apparatus when drilling holes in rock formations 54 for instance a water reservoir 56 where a hose or pipe 48 for the supply of water needs replacement. As illustrated, a drill bit 50 is mounted on the forward end of the apparatus for drilling into the rock formation 54 at an upward angle. The apparatus is also connected to a hydraulic motor 62 at the opposite end. Motor 62 is, in turn, connected with a directional tool mounted at the end of a pipe or hose 60. The pipe or hose 60 extends to a drum that is operatively connected to a hydraulic generator 58 that, as is known, supplies hydraulic fluid through the pipe or hose 60 to the hydraulic motor 62 for operating the drill bit 50.

This propulsion apparatus can be produced in all sizes, and used for operation in all elongated cavities where tasks that require propulsion are to be effected.

What is claimed is:

1. An apparatus comprising a plurality of rollers disposed on and longitudinally of a common axis, each said roller having a cylindrical shape and a pair of plane end sliding surfaces, each said surface being disposed at an inclined angle to said common axis and in abutment with an end sliding surface of an adjacent roller; and a plurality of ring shaped sliding elements, each said sliding element being mounted at an angle peripherally on and about a respective one of said rollers for rotation relative to said respective roller;

whereby upon imposition of an axial compressive force thereon, said rollers slide relative to each other radially of said common axis to engage said sliding elements thereon with a surrounding wall.

2. An apparatus as set forth in claim 1 further comprising a shaft on said common axis, each said roller having a radially extending slot passing therethrough and sized to receive said shaft with a clearance to permit said roller to move radially of said shaft.

3. An apparatus as set forth in claim 1 further comprising guiding means receiving a sliding surface of an adjacent roller for guiding said adjacent roller radially of said common axis.

4. An apparatus as set forth in claim 1 further comprising a membrane disposed over and receiving said rollers and said sliding elements therein.

5. An apparatus as set forth in claim 1 further comprising drive means for rotating said sliding elements.

6. An apparatus as set forth in claim 1 wherein each said roller is circumferentially displaced relative to an adjacent roller to center said rollers within a cavity.

7. An apparatus as set forth in claim 6 wherein each said roller is circumferentially displaced relative to an adjacent roller at an angle of 72° and the total circumferential displacement of said rollers is 360°.

8. An apparatus as set forth in claim 1 wherein each sliding element includes an inner ring mounted on a respective roller at an inclined angle, an outer ring disposed about said inner ring and a plurality of ball bearings between said rings to allow rotation of said outer ring relative to said inner ring.

9. An apparatus as set forth in claim 8 wherein said inner ring on a respective roller is movable between said inclined angle and a perpendicular position relative to said roller and which further includes a spring mounted between said inner ring and said respective roller for biasing said inner ring from said perpendicular position into said inclined angle.

10. An apparatus for propulsion through a pipeline comprising a plurality of rollers disposed on and longitudinally of a common axis, each said roller having a cylindrical shape and a pair of plane end sliding surfaces, each said surface being disposed at an inclined angle to said common axis and in abutment with an end sliding surface of an adjacent roller;

a plurality of ring shaped sliding elements, each said sliding element being mounted at an angle peripherally on and about a respective one of said rollers for rotation relative to said respective roller and for contact with an inner wall of the pipeline; and drive means for rotating at least one of said rollers and said sliding elements whereby upon imposition of an axial compressive force thereon, said rollers slide relative to each other radially of said common axis to engage said sliding elements thereon with the inner wall of the pipeline.

* * * * *